United States Patent [19]

Ariyoshi et al.

[11] Patent Number: 4,912,559
[45] Date of Patent: Mar. 27, 1990

[54] IMAGE PROCESSING METHOD

[75] Inventors: Shunji Ariyoshi; Shuichi Tsujimoto, both of Kanagawa, Japan

[73] Assignee: Kabushiki Kaisha Toshiba, Kanagawa, Japan

[21] Appl. No.: 235,866

[22] Filed: Aug. 24, 1988

[30] Foreign Application Priority Data

Sep. 21, 1987 [JP] Japan .............................. 62-234778

[51] Int. Cl.$^4$ ............................................. H04N 1/419
[52] U.S. Cl. .............................. 358/261.1; 358/261.2; 382/46
[58] Field of Search ............... 358/261.1, 261.2, 261.3, 358/261.4, 280, 443; 382/46

[56] References Cited

U.S. PATENT DOCUMENTS

| | | | |
|---|---|---|---|
| 4,193,097 | 3/1980 | Kurahayashi et al. | 358/261.1 |
| 4,542,413 | 9/1985 | Rallapalli et al. | 358/261.4 |
| 4,573,201 | 2/1986 | Hayashiyama et al. | 358/261.3 |
| 4,611,232 | 9/1986 | Searby | 382/46 |
| 4,618,846 | 10/1986 | Ross et al. | 358/261.1 |
| 4,618,991 | 10/1986 | Tabata et al. | 382/46 |
| 4,673,987 | 6/1987 | Toyokawa | 358/280 |
| 4,682,215 | 7/1987 | Adachi | 358/261.1 |
| 4,723,297 | 2/1988 | Postl | 382/46 |

Primary Examiner—Tommy P. Chin
Assistant Examiner—Kim Yen Vu
Attorney, Agent, or Firm—Finnegan, Henderson, Farabow, Garrett and Dunner

[57] ABSTRACT

An image processing method which includes a step for obtaining projections formed on coordinate axes having a predetermined inclination with respect to the coordinate axes of the horizontal and vertical directions. The projections are obtained run by run from image data coded in run length representation. The method also includes a step for adding the respective run-by-run projections through the entire image so as to obtain the projections of image data on the inclined coordinate axes. This method enables the image data to be processed without decoding. Further, the method allows a significant reduction in the amount of processing and also allows high-speed processing.

8 Claims, 5 Drawing Sheets

| i \ j | 1 | 2 | 3 | 4 | 5 |
|---|---|---|---|---|---|
| 1 | 02H | 81H | 03H | | |
| 2 | 02H | 82H | 02H | | |
| 3 | 02H | 82H | 01H | 81H | |
| 4 | 81H | 01H | 82H | 01H | 81H |
| 5 | 81H | 01H | 82H | 01H | 81H |
| 6 | 86H | | | | |

FIG. 6

IMAGE PROCESSING METHOD

BACKGROUND OF THE INVENTION

1. Field of the Invention

This invention relates to an image processing method in which projection calculations of images are performed on the basis of image data coded by use of a run length representation.

2. Description of the Prior Art

The technical term "run length representation" is understood in the art to mean a method in which an image is represented by indicating how many white pixels (or black pixels) lie on respective continuous lines of the image.

In general, projection calculations of images have been utilized as techniques of image processing in object recognition and character recognition, and to provide a sense of sight for industrial robots. A projection calculation is a calculation to obtain the number of black pixels that exist in the respective rows of the image along an x-y coordinate system, as shown in FIG. 8.

In a projection calculation, the horizontal and vertical axes of an image are usually used as the x-y coordinate system. However, in many cases, a projection, which is projected onto a coordinate axis v of a U-V coordinate system inclined by a predetermined angle $\theta$ with respect to the x-y coordinate system as shown in FIG. 9, must be calculated.

Conventionally, such a projection is calculated directly from the image data expanded on a pixel-by-pixel basis in a memory unit. Specifically, the number of the respective pixels are received from the memory unit. If the received pixel is a black pixel, then one (1) is added to the value of the projection calculation.

For example, when a projection projected onto the y-axis is expressed using a program in the conventional method, the program is as follows:

```
for i : = 1 to X do begin for j : = 1 to Y do if  a [i, j] = BLACK then h [i] : = h [i] + 1 end
``` where an array "a" represents an image, and "h" represents a projection. Constants X and Y represent horizontal and vertical lengths of the image, respectively. This means that the accumulation of black pixels in the respective lines of the Y-direction is performed.

In the case of the conventional method, the number of repetitions of access to the pixel memory and the amount of processing are very large. Thus, it is difficult to obtain sufficiently high-speed operation without depending on additional hardware. Moreover, even with such additional hardware, when a large-size image is required, the amount of additional hardware, such as a memory or the like, can become very large.

In addition, image data usually have a large amount of information. Thus, such image data are usually compressed using a run length representation into coded data, and stored in the memory. When projections are calculated from such coded image data using the conventional method, the coded data must be decoded, and then expanded to pixels in the memory.

Then, the projection projected onto the prescribed coordinate axis is calculated from such image data in the memory. Consequently, the efficiency of these procedures is low, and this has been disadvantageous.

SUMMARY OF THE INVENTION

Accordingly, one object of the present invention is to provide an image processing method in which the amount of processing is significantly reduced, so as to calculate image projections at a high-speed. Further, when proper software is used instead of depending on excessive hardware, significantly higher-speed processing can be obtained. In particular, image ddata coded by run length representation can be processed without the need for decoding.

Briefly, in accordance with one aspect of this invention, there is provided an image processing method that comprises a step of obtaining projections formed on two coordinate axes having a predetermined inclination with respect to the horizontal and vertical directions in such a manner that the projections are obtained run by run from image data coded in a run length representation. The method also comprises a step of adding the respective run-by-run projections to the entire run-by-run based image data so as to obtain the projections of image data on the inclined coordinate axes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a diagram illustrating a table that stores run lengths employed in one embodiment according to the present invention;

DESCRIPTION OF THE PREFERRED EMBODIMENTS

In accordance with the present invention, an image processing method is provided in which image data coded in a run length representation are not processed by decoding and expanding by pixel in the memory, but are processed without need for any decoding. Thus, projections in arbitrary directions can be calculated at a high speed.

In general, the so-called run length coding method, in which images are represented by the lengths of black pixel runs and white pixel runs, has been used conventionally. This method is used for data compression.

All of the positions (starting points and lengths) of black pixel runs included in an image are readily obtained by a run length representation. Thus, the projections of the respective black pixel runs toward a given direction can be readily calculated. The thus obtained projection values are summed up for all of the black pixel runs. As a result, the projections of a whole image in the corresponding direction can be obtained.

Figure 1:
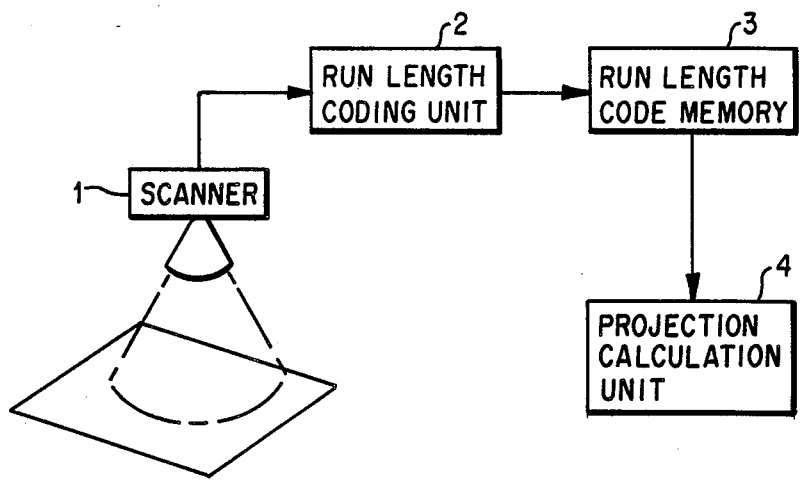
FIG. 1 is a diagram illustrating a schematic configuration of one embodiment according to the present invention.

Referring now to the drawings, wherein like reference numerals designate identical or corresponding parts throughout the several views, and more particularly to FIG. 1 thereof, one embodiment of this invention will be described. In FIG. 1, an image received through a scanner 1 is fed into a run length coding unit 2. The unit 2 converts the thus received image into run length codes. These codes are fed into a run length code memory 3, and stored therein. A projection calculation unit 4 receives the data stored in the memory 3 so as to calculate a projection.

Figure 2:
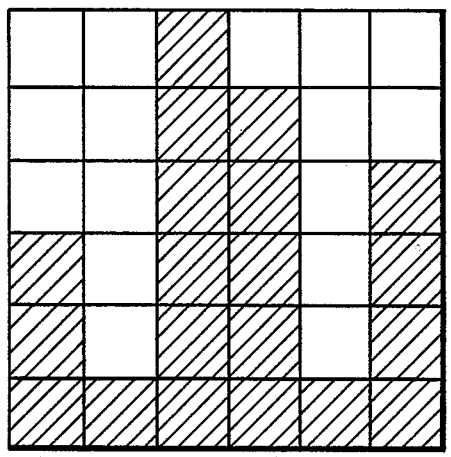
FIG. 2 is a diagram illustrating an example of received images to be processed by one embodiment according to the present invention.

An example of run length coding will be described as follows. Here, the received image is assumed to be that shown in FIG. 2. The run lengths of white pixel runs and black pixel runs in the respective lines of the image are as follows.

| First line | 2 (white), | 1 (black), | 3 (white). |
|---|---|---|---|
| Second line | 2 (white), | 2 (black), | 2 (white). |
| Third line | 2 (white), | 2 (black), | 1 (white), |
|  | 1 (black). |  |  |
| Fourth line | 1 (black), | 1 (white), | 2 (black), |
|  | 1 (white), | 1 (black). |  |
| Fifth line | 1 (black), | 1 (white), | 2 (black), |
|  | 1 (white), | 1 (black). |  |
| Sixth line | 6 (black). |  |  |

Figure 3:
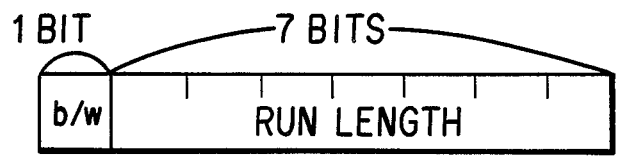
FIG. 3 is a diagram illustrating a configuration of run length codes employed in one embodiment according to the present invention.

When these data are represented as runs of the run length codes shown in FIG. 3, this image is coded as follows:

| 02H, | 81H, | 03H |  |  |
|---|---|---|---|---|
| 02H, | 82H, | 02H |  |  |
| 02H, | 82H, | 01H, | 81H |  |
| 81H, | 01H, | 82H, | 01H, | 81H |
| 81H, | 01H, | 82H, | 01H, | 81H |
| 86H |  |  |  |  | where H represents that the respective numbers are expressed in hexadecimal. In this coding, the most significant bit of each word indicates whether the run is black (1), or white (0).

The above-described data are stored in the run length code memory 3. Next, the algorithms by which the unit 4 calculates a projection from these data will be described.

Figure 4:
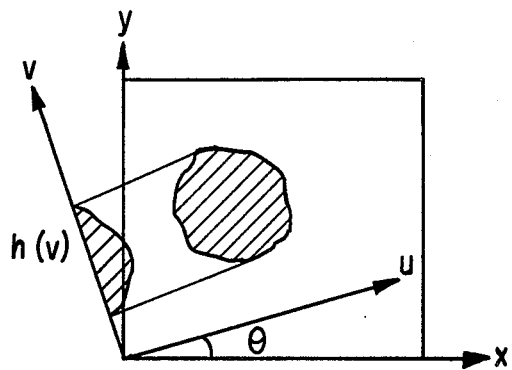
FIG. 4 is a diagram for explaining an example of a projection to be processed by a method according to the present invention, on a coordinate system having an inclination.

Here, as shown in FIG. 4, a u-v coordinate system having an inclination of an angle $\theta$ with respect to the x-y coordinate system is considered. Now, a projection h(v) projected onto the v axis is obtained as follows.

Figure 5:
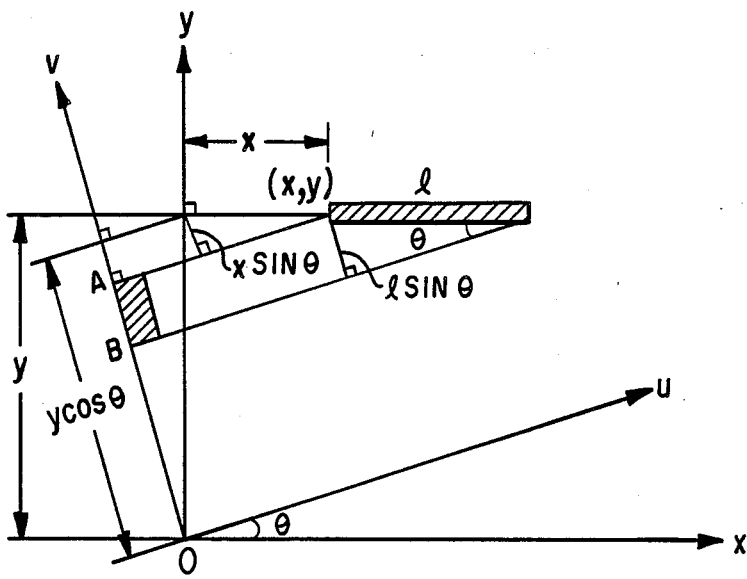
FIG. 5 is a diagram for explaining the operation of one embodiment according to the present invention, and illustrating a projection of a black pixel run projected onto an inclined coordinate system.

The positions and lengths of the respective runs that constitute the image can be obtained from the run length codes. Thus, as shown in FIG. 5, a projection projected from a black pixel run onto a v axis can be obtained. Specifically, when the starting point of a black pixel run on the x-y coordinate system is (x, y) and the run length thereof is l, the projection on the v axis of the u-v coordinate system inclined by an angle of $\theta$ can be obtained by the distance between points A and B. This distance can be defined as follows: $y \cos \theta - x \sin \theta - l \sin \theta \leq v \leq y \cos \theta - x \sin \theta$. The distance between the points A and B on the v axis is defined as h(v)=1, which means a projection exists on the v axis. The remaining portion on the v axis is defined as h(v)=0, which means a projection does not exist. The points A and B, which determine the opposite ends of the projection, can be obtained as follows:

$$OA = y \cos \theta - x \sin 74$$

$$OB = [OA - l \sin \theta$$
$$= y \cos \theta - x \sin \theta - l \sin \theta.$$

Further, when the whole black pixel number is required to be maintained constant independently of the inclination angle $\theta$, the above-described definition is changed, as follows:

$h(v) = 1/\sin \theta$ (when $y \cos \theta - x \sin \theta - l \sin \theta < v < y \cos \theta - x \sin \theta$)

$h(v) = 0$ (except for the above conditions)

This means that when the coordinate axes are in horizontal and vertical directions, the pixel unit length is 1. However, when the coordinate axes are inclined, the pixel unit length is not 1.

Projections which are obtained in the above-described manner are accumulated for all the black pixel runs on the coordinate axes. As a result, a projection representing the whole image can be obtained.

These procedures can be expressed by a form of the following program.

```
for i: = -X*sin θ to Y*cos θ do
    h[i]: = 0;
for i: = 1 to Y do
    begin
    Y: = i - 1;for j: = 1 to (the number of runs in a line i) do
    begin
    l: = run-length (C[i,j]);
    if color (C[i,j]) = BLACK then
        for k: =y*cos θ - x*sin θ - 1*sin θ
            to y*cos θ - x*sin θ do
            h[k]: = h[k] + 1;
            (or h[k]: = h[k] + 1/sin θ)
    x: = x + 1;
    end
end
``` where an arrangement C [i,j] represents the run length code of the jth run in the ith line in the table shown in FIG. 6. This table shows the run length codes of the image data in order. The "run-length (C)" is a function that represents a run-length of the code C. The "color (C)" is a function that represents whether the code is black or white. Specifically, the run length code C[i,j] of the jth run in the ith line is read from memory. From this C[i,j], the run length l and starting points (x and y) can be obtained. Next, a range k, which relates to the projection on the prescribed coordinate axis v, is obtained from x, y and l and the inclination angle $\theta$ with respect to the horizontal and vertical directions of the coordinate axes u and v. Next, 1 is added only to the count h [k] corresponding to this range k. These procedures are performed with respect to all of the combinations of the jth run in the ith line.

Figure 7:
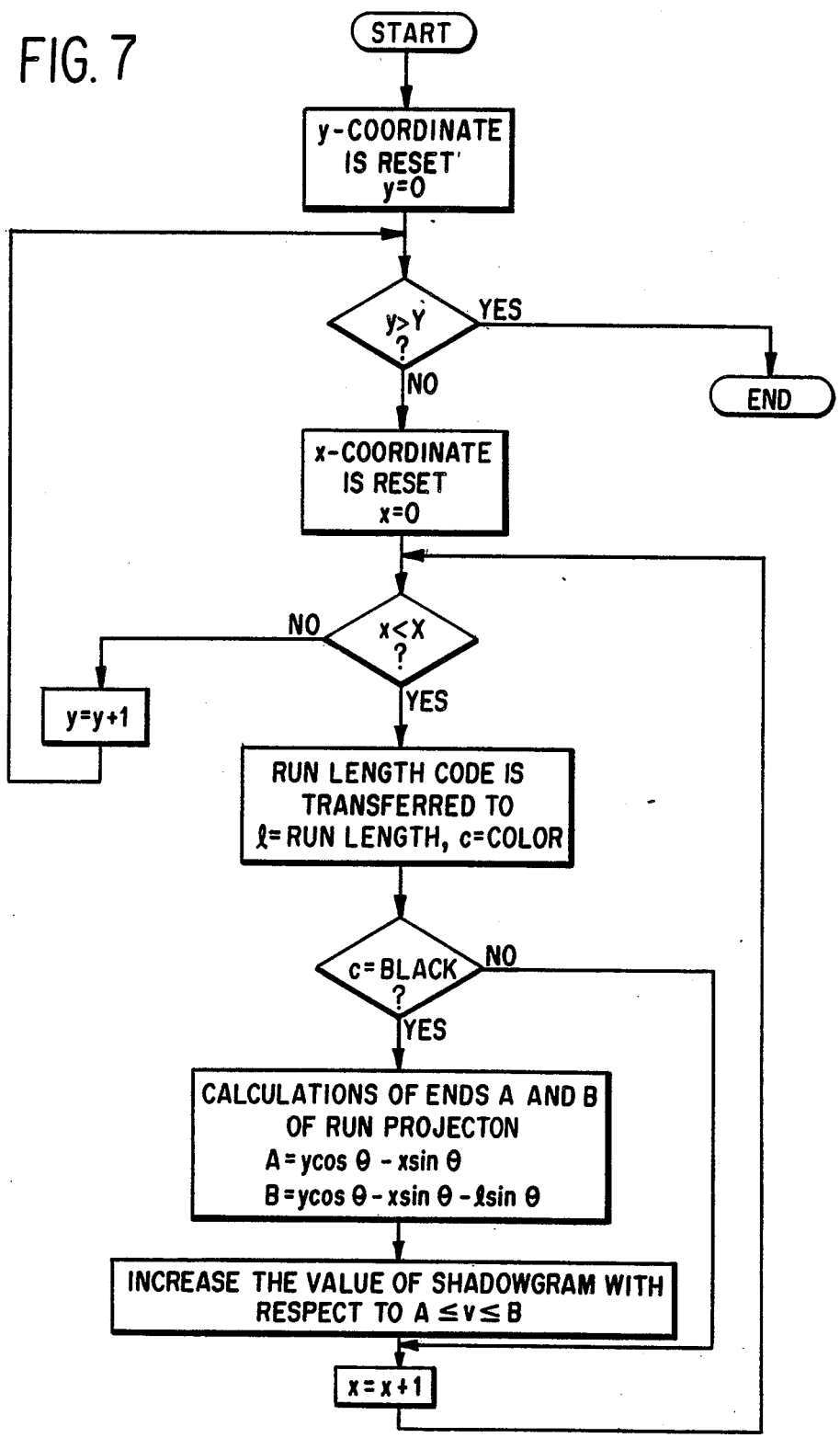
FIG. 7 is a flow chart for explaining the operation of one embodiment according to the present invention.
Figure 8:
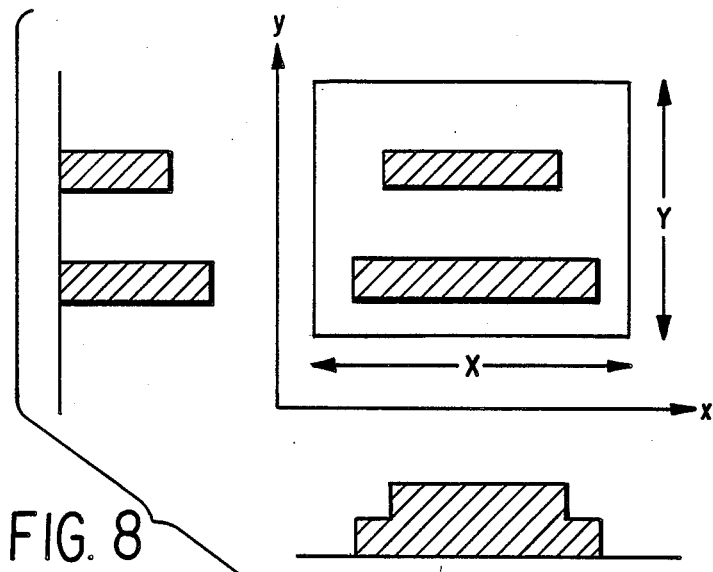
FIG. 8 is a diagram for explaining a conventional method of projection calculation.
Figure 9:
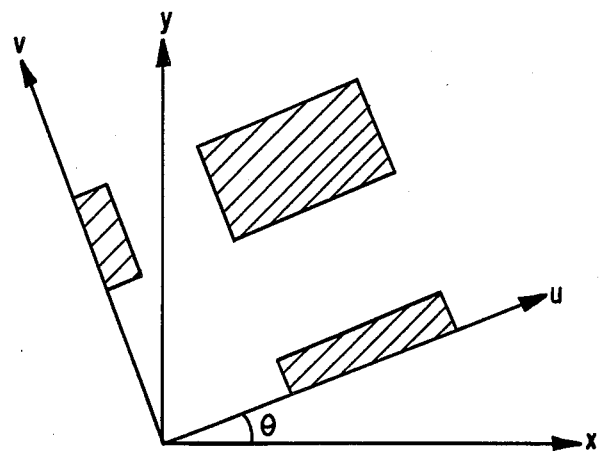
FIG. 9 is a diagram for explaining a conventional method of projection calculation on an inclined coordinate system.

FIG. 7 is a flow chart illustrating essential portions of the above-described processing routine.

As described above, according to the present invention, when projections of images are obtained, it is unnecessary to access the memory in a pixel-by-pixel manner. Thus, a large number of pixels are accessed at a time. Therefore, the amount of processing can be significantly reduced. As a result, a sufficiently high-speed processing can be obtained without dedicated hardware. In other words, the processing can be achieved even with a general-purpose computer and software.

Moreover, coded data which are significantly compressed can be used as image data. Thus, the amount of memory can be reduced.

Furthermore, the above-described method effects a significant reduction in the cost of manufacturing apparatus for processing projection calculation of images. The method can also achieve higher-speed processing.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image processing method comprising the steps of:
   scanning an image to be processed in a predetermined pixel pattern with respect to coordinate axes on a predetermined plane;
   coding data corresponding to the scanned image pixel pattern in run length representation;
   modifying the coded data without decoding for compensating for a predetermined inclination of the image with respect to the coordinate axes on the predetermined plane; and
   generating a projection representing the appearance of the image from the coded data on the predetermined plane.

2. The method of claim 1 wherein the step of coding includes the step of assigning a run length code corresponding to a portion of the image, said run length code including color data corresponding to a color of the portion and run length data corresponding to a length of the portion.

3. The method of claim 2 wherein the step of assigning includes the step of selecting color data corresponding to one of the colors black and white.

4. The method of claim 2 wherein the step of assigning includes the step of limiting the color data to one bit and the run length data to seven bits for each corresponding portion of the image.

5. The method of claim 3 wherein the step of coding includes the step of storing the coded data in a memory.

6. the method of claim 5 wherein the step of modifying includes the step of reading the coded data from the memory and judging whether the color data corresponding to each portion is black or white.

7. The method of claim 1 wherein the step of scanning includes the step of detecting one of two color states of portions of the image inclined at the predetermined inclination to the coordinate axes on the predetermined plane, wherein the step of coding includes the step of assigning a run length code to each portion of the image, including color data corresponding to the color state of that portion, and wherein the step of generating includes the step of calculating a corrected value for each said run length code in accordance with a difference between the positions of the inclined image on the predetermined plane and the corresponding image on the coordinate axes.

8. An image processing method comprising the steps of:
   coding image data into run length codes including run color information and run length information;
   storing said run length codes in memory means;
   reading said run length codes from said memory means to judge whether said run color information is black or white;
   obtaining, when said run color information indicates a black run, a projection on an inclined coordinate axis with a predetermined inclination angle of $\theta$, said projection being projected from a black pixel run having a length of l and having a starting coordinate (x, y) on the coordinate axes of the horizontal and vertical directions, said projection having a starting point A and an end point B on said inclined coordinate axis, said points A and B being obtained as follows:

$A = y \cos \theta - x \sin \theta$ $B = y \cos \theta - x \sin \theta - l \sin \theta$; and obtaining a projection of the entire image by accumulating all of said projections projected from black pixel runs of image data, said accumulation being made on said inclined coordinate axis.

* * * * *